US008287976B2

(12) United States Patent
Hupp

(10) Patent No.: US 8,287,976 B2
(45) Date of Patent: *Oct. 16, 2012

(54) UNIQUELY PERFORATED WEB PRODUCT

(75) Inventor: Matthew Todd Hupp, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 235 days.

This patent is subject to a terminal disclaimer.

(21) Appl. No.: 12/819,286

(22) Filed: Jun. 21, 2010

(65) Prior Publication Data

US 2011/0311748 A1    Dec. 22, 2011

(51) Int. Cl.
*B32B 29/00* (2006.01)
*B26F 1/10* (2006.01)

(52) U.S. Cl. ............ 428/43; 4/245.1; 4/245.8; 162/114; 428/98; 428/131

(58) Field of Classification Search .................. 428/43, 428/131, 98; 162/114; 4/245.1, 245.8
See application file for complete search history.

(56) References Cited

U.S. PATENT DOCUMENTS

| 405,412 A | 6/1889 | Hicks |
| 453,003 A | 5/1891 | Hicks |
| 714,652 A | 11/1902 | Davis |
| 1,170,589 A | 2/1916 | Wheeler |
| 3,467,250 A | 9/1969 | D'Elia et al. |
| 3,583,558 A | 6/1971 | Davis |
| 3,752,304 A | 8/1973 | Alef |
| 3,762,542 A | 10/1973 | Grimes |
| 3,770,172 A | 11/1973 | Nystrand et al. |
| 3,931,886 A | 1/1976 | Yamauchi |
| 4,029,938 A | 6/1977 | Martin |
| 4,035,611 A | 7/1977 | Martin et al. |
| 4,100,396 A | 7/1978 | Martin |
| 4,199,090 A | 4/1980 | Reed |
| 4,210,688 A | 7/1980 | Sato |
| 4,219,727 A | 8/1980 | Bolt |
| 4,220,490 A | 9/1980 | Carlson |
| 4,247,754 A | 1/1981 | Baier |
| 4,355,226 A | 10/1982 | Hall |
| 4,423,101 A | 12/1983 | Willstead |
| 4,441,952 A | 4/1984 | Mullane, Jr. |
| 4,457,964 A | 7/1984 | Kaminstein |
| 4,500,770 A | 2/1985 | Vock et al. |
| 4,503,318 A | 3/1985 | Hall |

(Continued)

FOREIGN PATENT DOCUMENTS

DE        3043845 A1     10/1981

(Continued)

OTHER PUBLICATIONS

Anon, "Easycut—The Fast Way to Open a Product," *Packag. Rev.*, 24(5):31 (1998), Accession No. A20114701.

(Continued)

*Primary Examiner* — Brent O'Hern
(74) *Attorney, Agent, or Firm* — Peter D. Meyer

(57) ABSTRACT

Web products are disclosed which include forming selected perforation designs and patterns. The perforation designs and patterns can be formed in linear or nonlinear fashion, can extend in the cross direction or the machine direction and can be formed to complement or match an embossed or printed design on the web. The perforation designs and patterns can be formed utilizing various mechanical perforating techniques.

20 Claims, 6 Drawing Sheets

U.S. PATENT DOCUMENTS

| | | | |
|---|---|---|---|
| 4,509,908 A | 4/1985 | Mullane, Jr. | |
| 4,636,161 A | 1/1987 | Raley et al. | |
| 4,646,364 A | 3/1987 | O'Larey | |
| 4,806,303 A | 2/1989 | Bianco et al. | |
| 4,842,794 A | 6/1989 | Hovis et al. | |
| 4,884,719 A | 12/1989 | Levine et al. | |
| 4,957,122 A | 9/1990 | Maldina et al. | |
| 4,995,930 A | 2/1991 | Merz et al. | |
| 5,041,317 A | 8/1991 | Greyvenstein | |
| 5,062,331 A | 11/1991 | Michal et al. | |
| 5,198,276 A | 3/1993 | Nakajima | |
| 5,202,077 A | 4/1993 | Marco et al. | |
| 5,205,454 A | 4/1993 | Schutz et al. | |
| 5,246,110 A | 9/1993 | Greyvenstein | |
| 5,405,663 A * | 4/1995 | Archibald et al. | 428/34.3 |
| 5,453,311 A | 9/1995 | Svensson | |
| 5,613,347 A | 3/1997 | Weder | |
| 5,616,387 A | 4/1997 | Augst et al. | |
| 5,704,566 A | 1/1998 | Schutz et al. | |
| 5,718,928 A | 2/1998 | Rieker | |
| 5,727,458 A | 3/1998 | Schulz | |
| 5,740,657 A | 4/1998 | Weder | |
| 5,740,658 A | 4/1998 | Weder | |
| D393,950 S | 5/1998 | Lockhart | |
| 5,755,654 A | 5/1998 | Schulz et al. | |
| 5,789,050 A | 8/1998 | Kang | |
| 5,839,688 A | 11/1998 | Hertel et al. | |
| 6,010,090 A | 1/2000 | Bushmaker et al. | |
| 6,029,921 A | 2/2000 | Johnson | |
| 6,119,439 A | 9/2000 | Stevie | |
| 6,136,209 A | 10/2000 | Kang | |
| 6,139,186 A | 10/2000 | Fraser | |
| 6,223,641 B1 | 5/2001 | Kang | |
| 6,289,777 B1 | 9/2001 | Hartmann et al. | |
| 6,460,727 B1 | 10/2002 | Irwin | |
| 6,487,762 B1 | 12/2002 | Fleissner | |
| 6,557,224 B2 | 5/2003 | Fleissner | |
| 6,565,794 B1 | 5/2003 | Fraser | |
| 6,733,626 B2 | 5/2004 | Ruthven et al. | |
| 6,735,834 B2 | 5/2004 | Fleissner | |
| 6,838,040 B2 | 1/2005 | Mlinar et al. | |
| 6,865,784 B2 | 3/2005 | Noelle | |
| 7,222,346 B2 | 5/2007 | Lenormand et al. | |
| 2002/0148085 A1 | 10/2002 | Fleissner | |
| 2003/0101557 A1 | 6/2003 | Fleissner | |
| 2003/0111169 A1 | 6/2003 | Baggot et al. | |
| 2003/0131454 A1 | 7/2003 | Noelle | |
| 2003/0132549 A1 | 7/2003 | Mlinar et al. | |
| 2003/0218040 A1 | 11/2003 | Faulks et al. | |
| 2005/0095403 A1 | 5/2005 | Noelle | |
| 2005/0241788 A1 | 11/2005 | Baggot et al. | |
| 2007/0014961 A1 | 1/2007 | Schneider et al. | |
| 2007/0209099 A1 * | 9/2007 | Issachar | 4/245.1 |
| 2008/0199660 A1 * | 8/2008 | Gelli | 428/172 |
| 2008/0280088 A1 | 11/2008 | Baum | |
| 2009/0022927 A1 | 1/2009 | Strobel et al. | |
| 2010/0163194 A1 * | 7/2010 | Sauter et al. | 162/114 |

FOREIGN PATENT DOCUMENTS

| | | |
|---|---|---|
| DE | 20013469 U1 | 11/2000 |
| DE | 102006049680 A1 | 4/2008 |
| EP | 0 054 907 A2 | 6/1982 |
| EP | 0 195 113 A2 | 9/1986 |
| EP | 0 689 819 A2 | 1/1996 |
| EP | 0 974 433 A1 | 1/2000 |
| EP | 1 529 477 A1 | 5/2005 |
| FR | 2292560 A1 | 6/1976 |
| GB | 1598188 A | 9/1981 |
| GB | 2183489 A | 6/1987 |
| GB | 2184390 A | 6/1987 |
| GB | 2184391 A | 6/1987 |
| JP | 08-084685 A | 4/1996 |
| JP | 9-279463 A | 10/1997 |
| JP | 11-091266 A | 4/1999 |
| JP | 3-140786 B2 | 3/2001 |
| JP | 2002-017607 A | 1/2002 |
| JP | 2004-049261 A | 2/2004 |
| JP | 2005-153997 A | 6/2005 |
| JP | 2005-296588 A | 10/2005 |
| JP | 2006-247311 A | 9/2006 |
| JP | 2007-117466 A | 5/2007 |
| WO | WO-92/03250 A2 | 3/1992 |
| WO | WO-03/026472 A1 | 4/2003 |
| WO | WO-2006/067260 A1 | 6/2006 |
| WO | WO-2008/068723 A1 | 6/2008 |
| WO | WO-2008/141598 A1 | 11/2008 |
| WO | WO 2010/076689 A1 | 8/2010 |

OTHER PUBLICATIONS

Klemm, "A Guide to Laser Cutting Technology, Part 1," *Screen Print*, 99(2):24-29 (2009), Accession No. A20331589.

Perkins et al., "Stress and Strain for Perforated Tensile Specimens, Part 2: FEA Simulations," *Tappi J.*, 6(4):22-27 (2007), Accession No. A20301227.

U.S. Appl. No. 12/819,271, filed Jun. 21, 2010, Hupp, Vaughn, Singer.

U.S. Appl. No. 12/819,277, filed Jun. 21, 2010, Hupp, Singer.
U.S. Appl. No. 12/819,296, filed Jun. 21, 2010, McNeil, Mellin.
U.S. Appl. No. 12/819,324, filed Jun. 21, 2010, McNeil, Mellin.
U.S. Appl. No. 12/819,344, filed Jun. 21, 2010, McNeil, Mellin.
U.S. Appl. No. 12/819,367, filed Jun. 21, 2010, McNeil, Singer.
U.S. Appl. No. 12/819,380, filed Jun. 21, 2010, McNeil, Singer.
U.S. Appl. No. 12/819,388, filed Jun. 21, 2010, McNeil, Singer.
U.S. Appl. No. 12/819,399, filed Jun. 21, 2010, Redd.
U.S. Appl. No. 12/819,420, filed Jun. 21, 2010, Kien, Redd.
U.S. Appl. No. 12/819,434, Jun. 21, 2010, Feldmann, Kien.

* cited by examiner

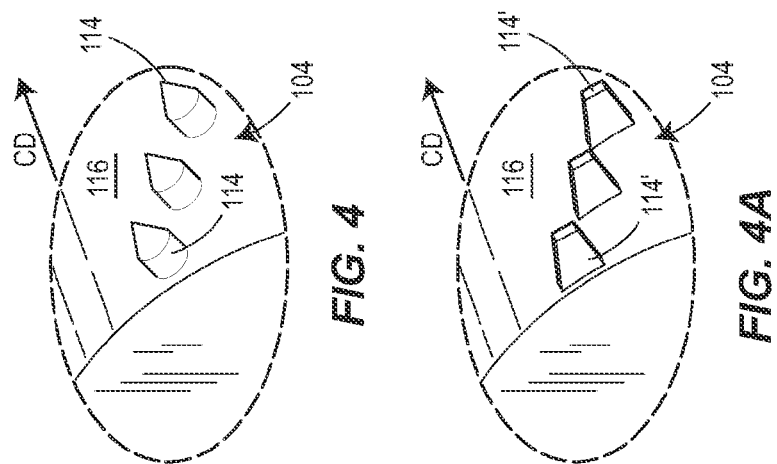
FIG. 4
FIG. 4A
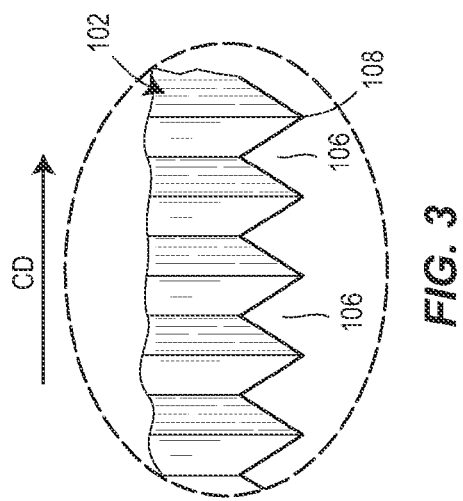
FIG. 3
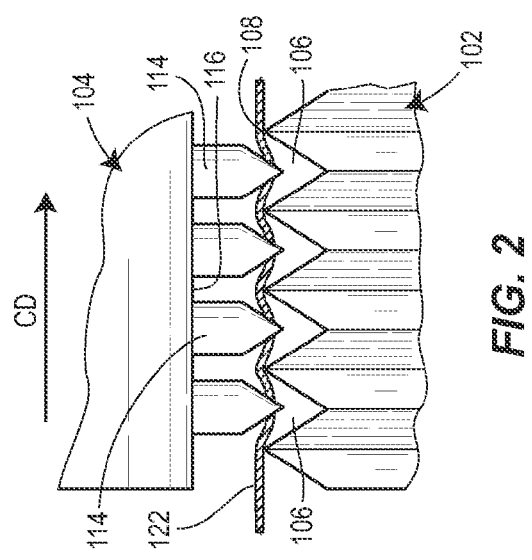
FIG. 2

UNIQUELY PERFORATED WEB PRODUCT

FIELD OF THE INVENTION

The present invention relates generally to perforated web products. The perforated web products have various capabilities, characteristics and features and, more particularly, to web products of this type having significantly improved reliability, lower manufacturing costs, greater flexibility, and higher perforation quality.

BACKGROUND OF THE INVENTION

For many years, it has been well known to perforate products manufactured from webs such as paper towels, bath tissue and the like to thereby facilitate the removal of sheets from a roll by tearing. There have been proposed a variety of types of mechanical apparatuses and numerous different methods for forming the perforations for these products. Typically, a moving blade has been utilized to perforate a web as it passes between the moving blade and a stationary anvil wherein the moving blade extends perpendicular to the direction of travel of the web.

While this conventional operation has been widely adopted, there are a number of well known drawbacks in terms of the overall reliability, manufacturing costs, flexibility, and perforation quality. Among the drawbacks is the fact that the interaction of the moving blade and the stationary anvil is known to impose a speed limitation since vibrations produced at high speeds adversely affect the overall quality of the perforations formed in a web. Further, the vibrations caused by the interaction of the moving blade and stationary anvil may result in costly web breaks or equipment malfunctions requiring a shutdown of the manufacturing operation.

For instance, it is known that the teeth on the moving blade become dull or broken after a period of use. This not only will result in an inferior and unacceptable level of perforation quality, but it will also require a temporary shutdown of the manufacturing operation to replace the moving blade and to discard inferior product produced immediately prior to shutdown. As will be appreciated, this results in unacceptable waste and significantly increased manufacturing costs.

In addition, another drawback to conventional equipment has been the inability to quickly change from one perforation pattern format (or sheet length) to another without significant down time for the changeover. It has typically been the case that this type of changeover requires the manufacturing operation to be shut down for at least several hours. While the changeover is occurring, there is obviously no product being produced and personnel must be actively engaged in implementing the changeover, all of which leads to significantly increased manufacturing costs.

In another respect, there has been a continuing need for greater flexibility in order to produce products having enhanced consumer desirability. For instance, it would be desirable to be able to produce both linear and nonlinear perforations as well as perforations extending in both the cross and machine directions. While various approaches have been suggested, none have offered the requisite level of perforation quality that would result in a fully acceptable product.

Additionally, it would be desirable to have perforations that are sufficiently strong to withstand winding of a web but also sufficiently weaken the web at least at the edges to facilitate the separation of one sheet from the next. Further, it would be desirable to have a wound or rolled perforated web product which is manufactured in such a manner that is possible for a line of perforations to complement, register with, or match an embossed or printed pattern on the web.

While various efforts have been made in the past which were directed to overcoming one or more of the foregoing problems and/or to providing one or more of the foregoing features, there remains a need for perforating apparatuses and methods and perforated web products having improved reliability, lower manufacturing costs, greater flexibility, and higher perforation quality.

SUMMARY OF THE INVENTION

While it is known to manufacture perforated web products such as paper towels, bath tissue and the like to facilitate the removal of sheets from a roll by tearing, it has remained to provide perforating apparatuses and methods and perforated web products which overcome the noted problems and provide the noted features. Embodiments of the present disclosure provide perforating apparatuses and methods and perforated web products having improved features which result in multiple advantages including enhanced reliability, lower manufacturing costs, greater flexibility, and higher perforation quality. Such apparatuses and methods not only overcome the noted problems with currently utilized conventional manufacturing operations, but they also make it possible to design and produce perforated products such as paper towels, bath tissue, and the like having enhanced practical and aesthetic desirability for the consumer.

In certain embodiments, a web product is formed of paper or a like material having one or more plies and having a first side and a second side including a plurality of spaced apart and repeating lines of perforation. The repeating lines of perforation formed in the web product are each comprised of a plurality of individual perforations. The perforations extend substantially from the first to the second side of the web and are selectively located relative to adjacent perforations so that a selected perforation design is provided for the repeating lines of perforation. The selected perforation design may be non-linear.

BRIEF DESCRIPTION OF THE DRAWINGS

FIG. 2 is a detailed view illustrating the circumferential protrusions on the rotatable pattern roll in cooperative alignment with the at least one circumferential groove in the rotatable ring roll and with the circumferential protrusions penetrating a web to form perforations;

FIG. 3 is a detailed view of the region labeled 3 in FIG. 1;

FIG. 4 is a detailed view of the region labeled 4 in FIG. 1;

FIG. 4A is a detailed alternative view of the region labeled 4 in FIG. 1;

DETAILED DESCRIPTION OF THE INVENTION

As used herein, the term "machine direction" (MD) means the direction of travel of a web through any processing equipment. The term "cross direction" (CD) is orthogonal and coplanar thereto. The term "Z-direction" is orthogonal to both the machine and cross directions.

The various embodiments of the present disclosure described in detail below provide several non-limiting examples of perforating apparatuses, methods, and several distinct perforated web products having improved features which result in enhanced reliability, lower manufacturing costs, greater flexibility, and higher perforation quality. With regard to these non-limiting examples, the described apparatuses and methods make it possible to effectively and efficiently design and produce a variety of different perforated web products having enhanced practical and aesthetic desirability.

Figure 1:
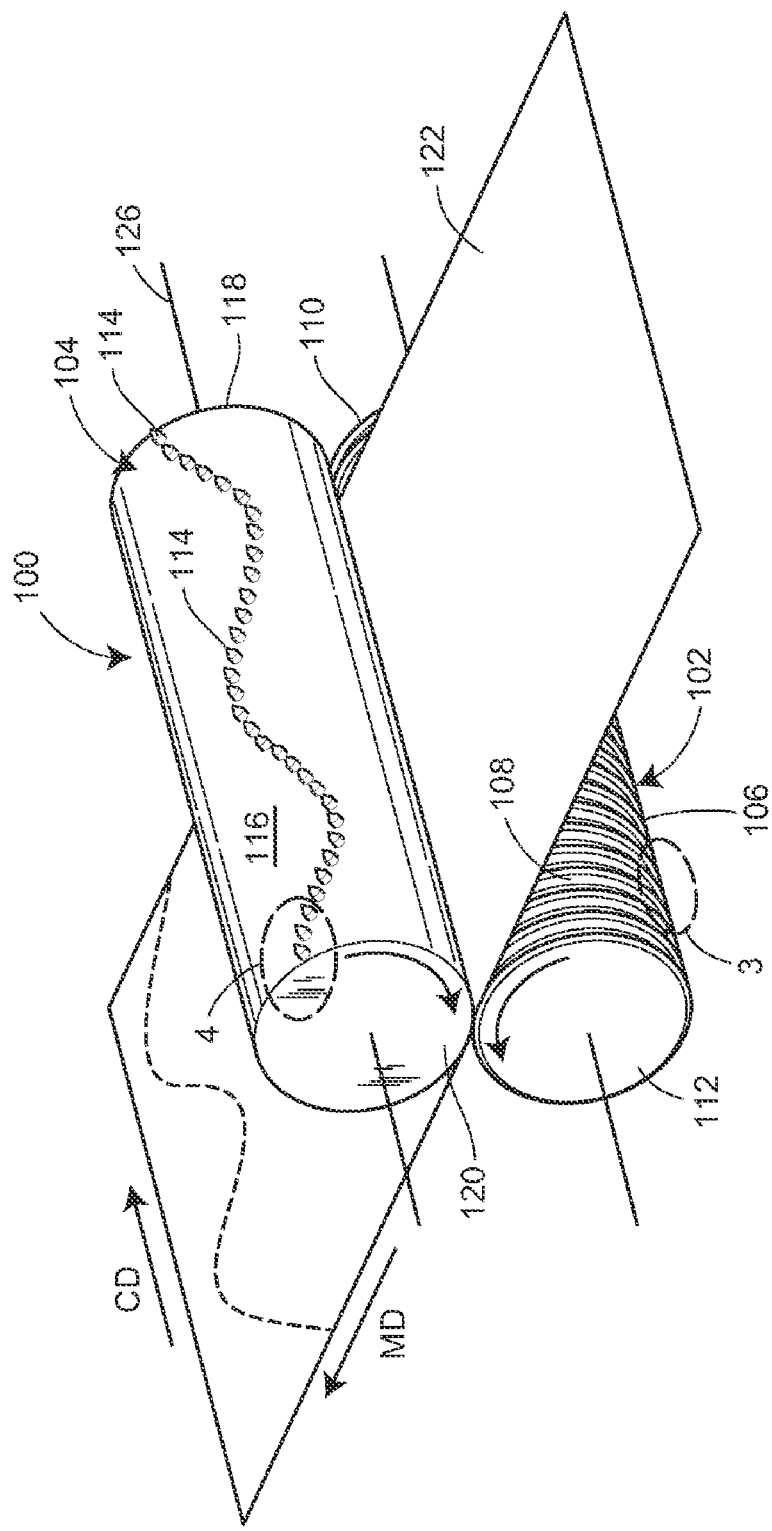
FIG. 1 is a perspective view of an exemplary apparatus for perforating a web utilizing a rotatable ring roll having at least one circumferential groove and a rotatable pattern roll having circumferential protrusions in cooperative alignment with the at least one circumferential groove.

Referring first to FIG. 1, an apparatus 100 for perforating a web includes a rotatable ring roll 102 and a rotatable pattern roll 104. The ring roll 102 has at least one circumferential groove 106 extending about an outer surface 108 (i.e., the ring roll 102 may have a single circumferential groove extending helically about the outer surface 108 from one end 110 to the other end 112 of the ring roll 102). However, the ring roll 102 may also be formed to have a plurality of parallel circumferential grooves 106 disposed between the ends 110 and 112.

As shown in FIGS. 2 and 3, the outer surface 108 of the ring roll 102 is provided with a plurality of the circumferential grooves 106. It will be readily apparent from these two views that each of the circumferential grooves 106 are parallel relative to each other although a single helical circumferential groove extending about the outer surface 108 from the one end 110 to the other end 112 of the ring roll 102 could be used in place of the illustrated parallel circumferential grooves 106.

Referring again to FIG. 1, the pattern roll 104 is provided with protrusions 114 extending from an outer surface 116 thereof. The protrusions 114 in a non-limiting example may be disposed from one end 118 to the other end 120 of the pattern roll 104 and located in a nonlinear fashion as shown or in a collectively linear fashion.

In any regard, the protrusions 114 may be placed at any location on the surface of pattern roll 104 so that collectively, the protrusions 114 will form a desired pattern having virtually any MD and CD characteristics. In other words, the protrusions 114 are positioned relative to the circumferential groove(s) 106 as shown in FIG. 2 to be in selected cooperative alignment with the circumferential groove(s) 106. The protrusions 114 may be shaped substantially as shown in FIG. 4, although it will be appreciated that the protrusions 114 may take various other forms. By way of example, they make take the pyramidal or trapezoidal form of protrusions 114' in FIG. 4A. Also, as previously suggested, they may be circumferentially positioned in any location on the outer surface 116 of the pattern roll 104. By selecting the location for each of the protrusions 114 on the outer surface 116 of the pattern roll 104, it is possible to produce a line of weakness in the form of a selected perforation design which may be linear or may be nonlinear relative to the CD (i.e., having MD and CD components) such as the non-limiting example illustrated in FIG. 1.

In a preliminary state, pattern roll 104 is provided with at least one circumferential groove similar (or a plurality of parallel circumferential grooves) similar to ring roll 102. Formation of the protrusions 114 may be accomplished by milling, grinding or otherwise removing portions of the circumferential grooves of pattern roll 104. The locations where it is desired to have a protrusion 114 are not so processed.

In other words, in a non-limiting example the ring roll 102 and the pattern roll 104 may start out as substantially identical rolls whereby the pattern roll 104 is formed by milling, grinding or otherwise removing material until only the desired protrusions 114 forming the selected perforation design having MD and/or CD components remain. The protrusions 114 are placed in cooperative alignment with the circumferential groove(s) 106 by suitably mounting the ring roll 102 in relation to the pattern roll 104 so they will be arranged substantially as illustrated in FIG. 2.

As shown in FIG. 2, a web 122 may be transported along a path between the ring roll 102 and the pattern roll 104 by a device which may comprise a conventional web rewinder of a type well known in the art. Also, rotation may be imparted to the ring roll 102 and the pattern roll 104 by a conventional motor and gear arrangement of a type well known in the art. In this manner, the protrusions 114 are caused to penetrate the web 122 as it is transported along the path between the ring roll 102 and the pattern roll 104 to produce a selected perforation design.

As used throughout the specification and claims, the word "penetrate" and any variants thereof means either 1) to disrupt the fiber structure of a web to weaken it by compressing or moving the fibers apart, or 2) to deflect or displace a web in the "Z" direction, i.e., perpendicular to the plane or surface of a web, or 3) to deflect or displace a web sufficiently to provide a visually perceptible perforation, or 4) to extend completely through a web, to thereby facilitate tearing or separating successive sheets of a fibrous structure by a consumer at defined locations, e.g., in perforations formed along rolls of paper towels, bath tissue and the like.

Figure 5:
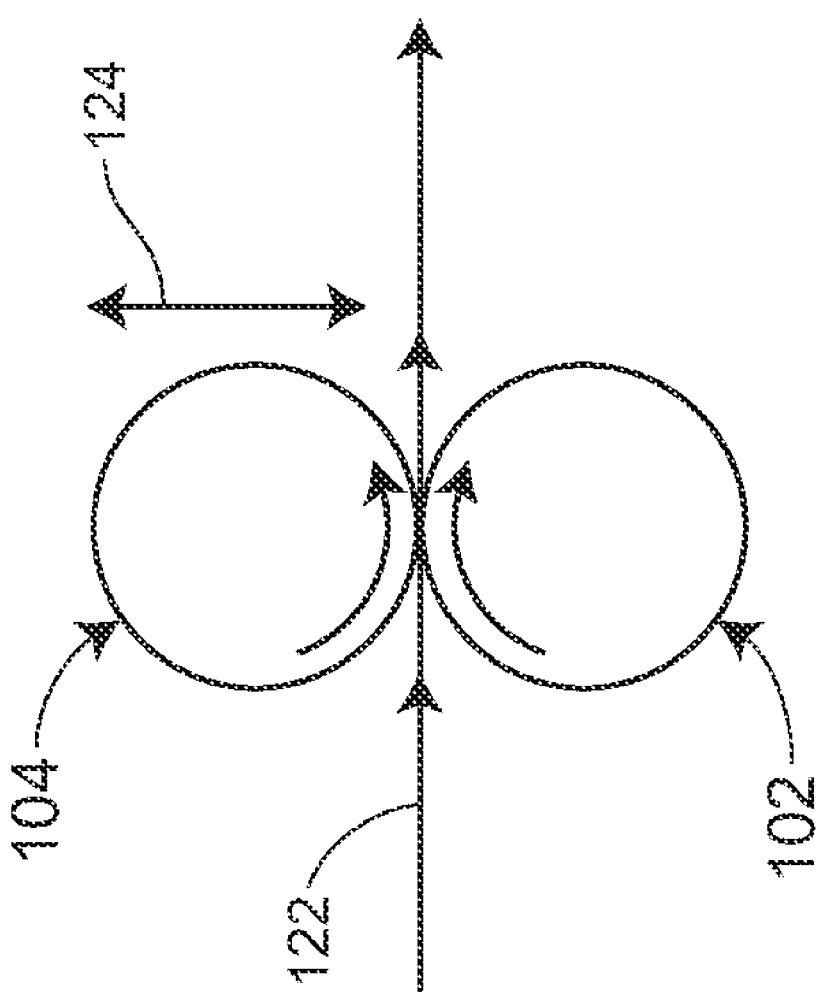
FIG. 5 is a schematic view illustrating one manner of adjusting the apparatus of FIG. 1 to vary perforation depth.

As will be appreciated, the protrusions 114 extending from the outer surface 116 of the pattern roll 104 penetrate the web 122 by mating with a corresponding circumferential groove(s) 106 extending about the outer surface 108 of the ring roll 102. FIG. 2 illustrates that the ring roll 102 is positioned in relation to the pattern roll 104 to provide a selected degree of penetration of the web 122 by the protrusions 114 to control the degree of weakening of the web 122. Referring to FIG. 5, it will be appreciated that the degree of penetration of the web 122 by protrusion 114 may be controlled by adjusting the position of the pattern roll 104 relative to ring roll 102, the position of ring roll 102 relative to pattern roll 104, and combinations thereof as represented by the arrowed line 124.

As used throughout the specification and claims, the phrase "degree of penetration" and any variants thereof means either 1) the extent to which the fibers in a web are compressed or moved apart, or 2) the extent to which the web is deflected or displaced in the "Z" direction, i.e., the direction perpendicular to the plane or surface of a web, or 3) the size of openings which are formed in a web, which determines the strength or weakness of the web between successive defined sheets after a selected perforation design has been formed in the web.

Additionally, and as used throughout the specification and claims, the phrase "degree of weakening" and any variants thereof, means the extent to which the strength of the web material disposed between successive sheets of web 122 has been weakened as a result of penetration of the web by protrusions 114 which can be controlled by selecting the size and/or selecting the pitch and/or selecting the chamfer of each individual protrusion 114. Specifically, the size of each protrusion 114 including its length and/or perimeter dimension and/or shape (see, e.g., FIGS. 4 and 4A for two examples of the wide variety of shapes that can be utilized) may be individually selected to provide the protrusions 114 with the same or different depths and/or breadths and/or footprints of engagement with the web 122 to thereby control the degree of weakening of the web 122, e.g., in the cross and/or machine directions. Furthermore, the depths to which the protrusions 114 extend can be controlled by varying the lengths of some or all of the protrusions 114 and by controlling the distance between the respective axes of the ring roll 102 and the pattern roll 104 to control the extent to which the protrusions 114 extend into the circumferential grooves 106.

By employing one or more of these techniques, each line of perforation can be provided with a differential perforation strength. For instance, the perforations in the cross direction of the web 122 can be formed to be weaker at or near the edges of the web 122 than the perforations in the middle of the web 122 to facilitate starting the separation of one sheet from the next sequential sheet on the web 122. In this manner, the perforations in the middle of the web 122 can be stronger so the web 122 can withstand material handling forces during manufacturing.

Of course, as will be appreciated, the ability to form every one of the protrusions 114 separately and individually makes it possible to vary the strength of each perforation in any manner and for any purpose whatsoever providing essentially unlimited possibilities.

The term "pitch" will be understood to mean the distance between the start of one circumferential protrusion 114 and the start of the next adjacent circumferential protrusion 114. The term "chamfer" will be understood to mean the angle that the surface of a circumferential protrusion makes relative to a line perpendicular to the axis of the pattern roll.

In addition, each protrusion 114 may be sized and/or shaped to provide a selected degree of weakening for that respective portion of the web 122 when the protrusions 114 penetrate the web 122 to produce a selected perforation design. Alternatively, the protrusions 114 may be provided, individually or collectively, with a selected pitch or chamfer to control the degree of weakening of the web 122 when the protrusions 114 penetrate the web 122. The protrusions 114 may extend generally along an axis of rotation 126 for the pattern roll 104 (see FIG. 1), and they may be individually circumferentially positioned about the outer surface 116 to produce the selected perforation design.

Still referring to FIG. 1, the protrusions 114 are shown extending from one end 118 to the other end 120 of the pattern roll 104 to form individual perforations extending generally in the cross direction of the web 122. There is only one set of the protrusions 114 shown in FIG. 1, but there may be two or more sets equally circumferentially spaced about the outer surface 116 of the pattern roll 104, depending upon the desired sheet length to be formed by cyclically perforating the web 122. If only one set of the protrusions 114 is provided on the outer surface 116 of the pattern roll 104, the sheet length formed by perforating the web 122 will be equal to the circumference of the pattern roll 104. Similarly, if there are two sets of the protrusions 114, the sheet length formed by perforating they web 122 will be equal to half the circumference of the pattern roll 104, if there are three sets of the protrusions 114, the sheet length formed by perforating they web 122 will be equal to one third the circumference of the pattern roll 104, etc. If desired, it is possible to provide two or more sets of the circumferential protrusions spaced unequal distances about the outer surface 116 of the pattern roll 104 if it was desired to provide varying but repeating sheet lengths while cyclically perforating the web 122.

While not shown in FIG. 1, it will be understood that the individual protrusions 114 may be formed at any location on the outer surface 116 of the pattern roll 104. Therefore, any selected perforation design may be produced on the web 122 with perforations extending generally in the cross direction and/or generally in the machine direction of the web. Moreover, the selected perforation design may be collectively linear or nonlinear, generally in the cross direction and/or the machine direction, and/or it may include entirely random perforations.

Figure 6:
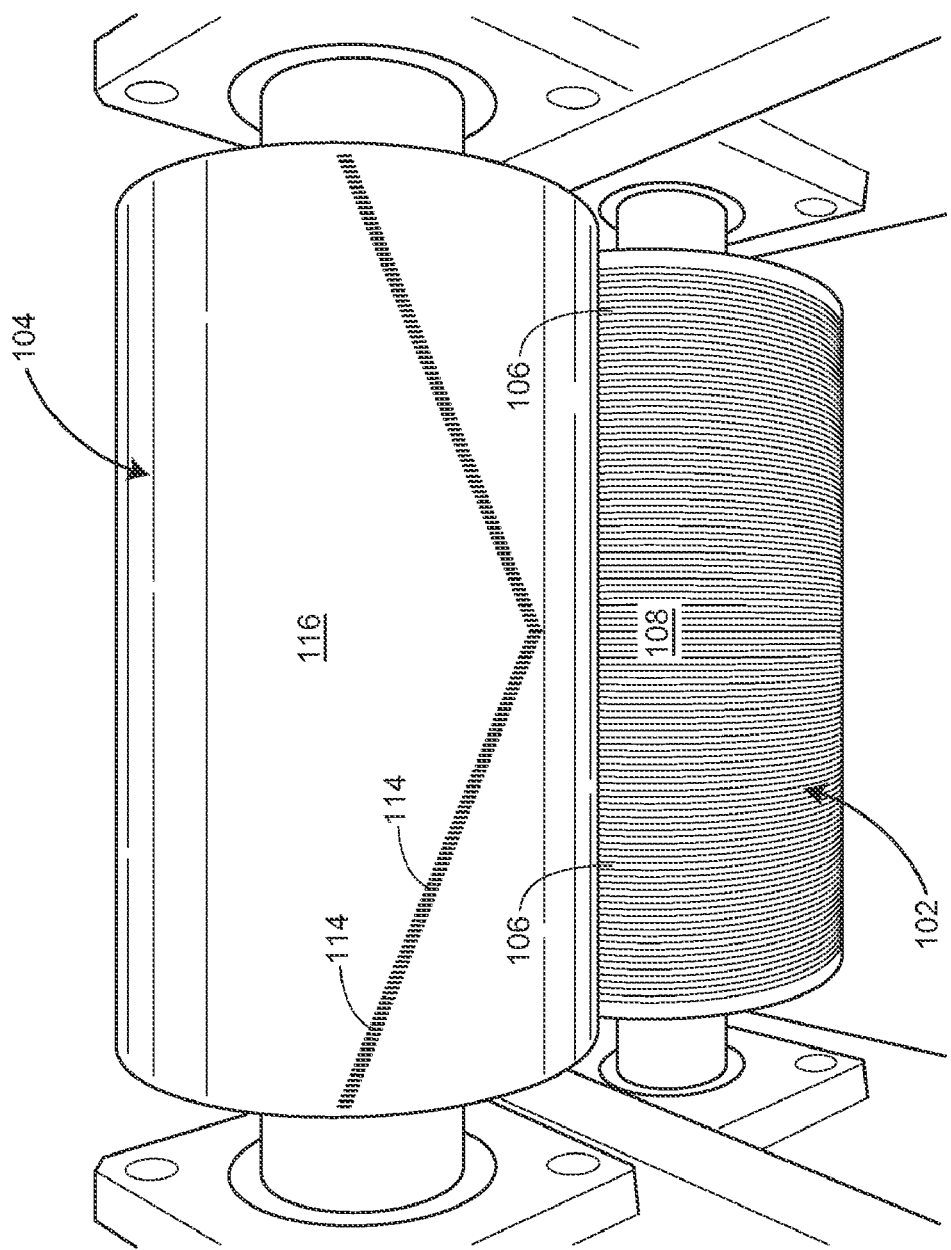
FIG. 6 is a front elevational view illustrating a selected perforation design utilizing the apparatus of FIG. 1.

Since the individual protrusions 114 may be located virtually anywhere on the outer surface 116 of the pattern roll 104, provided only that each circumferential protrusion 114 is aligned to cooperate with a circumferential groove 106, the perforation design that may be produced with the apparatus 100 may take virtually any form as will be appreciated from FIG. 6.

Figure 7A:
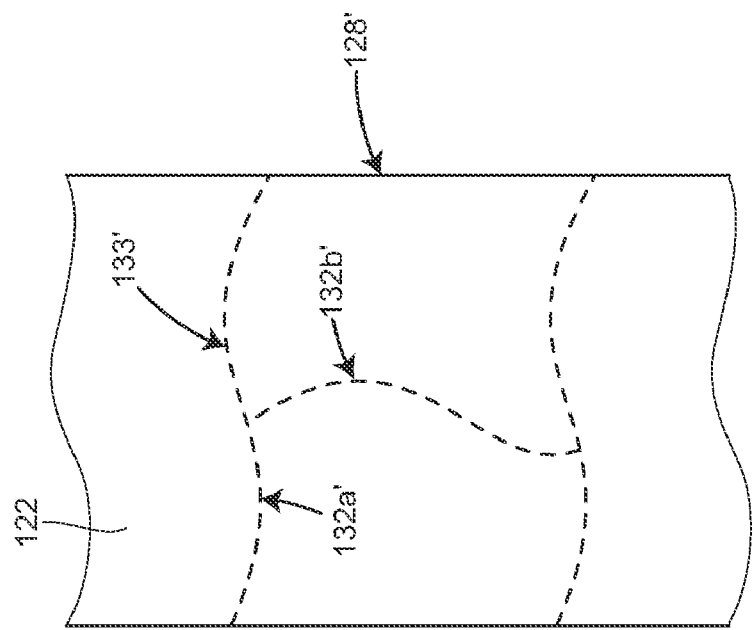
FIG. 7A is a plan view of a single sheet of a perforated web product having another of many different perforation designs or shapes extending non-linearly in the cross direction as well as the machine direction of the web.
Figure 7:
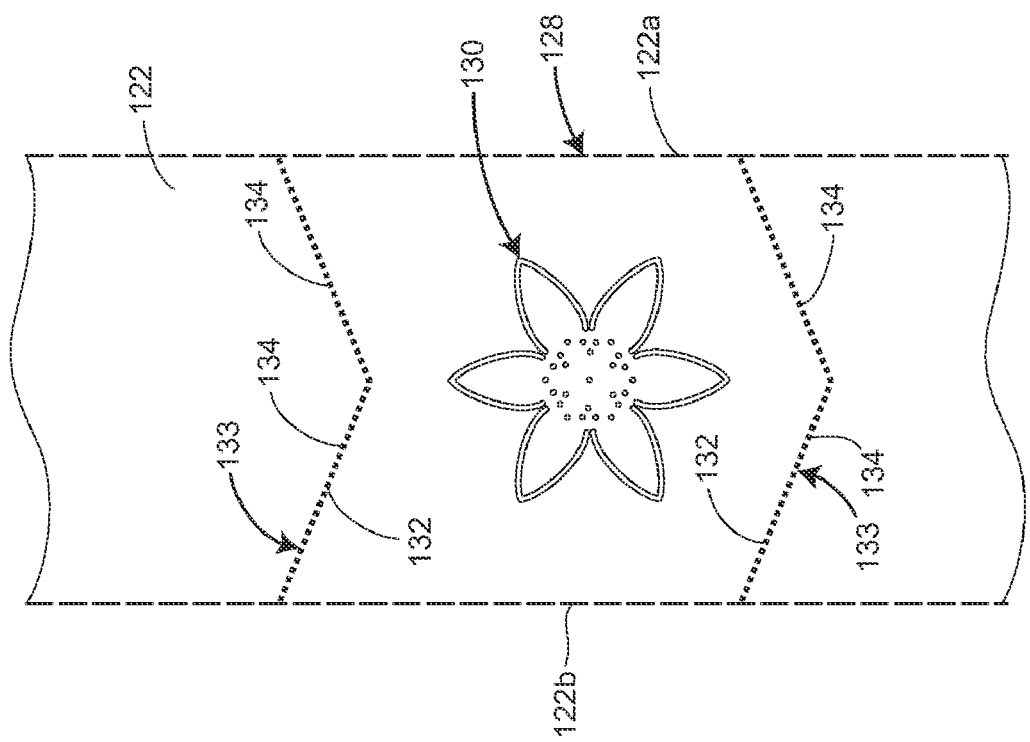
FIG. 7 is a plan view of a single sheet of a perforated web product having an embossed or printed pattern formed thereon and also having the selected perforation design utilizing the apparatus configured as in FIG. 6.

Referring to FIG. 7, a single sheet 128 formed on the web 122 by the apparatus 100 and having an embossed or printed indicia or aesthetic pattern 130 is illustrated. The single sheet 128 has a shaped perforation pattern 133 extending generally in the cross direction which at least complements and can even match the indicia or aesthetic pattern 130, if desired. As shown, the contours of the perforation pattern 133 form a chevron shape which is complementary to the indicia or aesthetic pattern 130 by appropriate arrangement of the protrusions 114. An exemplary but non-limiting apparatus and process for registering repeating shaped perforation patterns 133 that are formed in web 122 with the indicia or aesthetic pattern 130 are disclosed in U.S. Pat. Nos. 7,222,436 and 7,089,854.

Referring again to FIG. 6, the manner in which the protrusions 114 can be arranged on the outer surface 116 of the pattern roll 104 to produce a shaped perforation pattern such as 133 is illustrated. This view also illustrates that each circumferential protrusion 114 can align with a separate one of a plurality of parallel circumferential grooves 106. Thus, the web 122 can be penetrated by the protrusions 114 to produce the shaped perforation pattern 133 as the web 122 is transported between the rotating ring roll 102 and pattern roll 104 in FIG. 6.

The web 122 may be formed of paper or a like material having one or more plies and having a first side 122a and a second side 122b. The web 122 may include a plurality of spaced apart and repeating lines of perforation. These spaced apart and repeating lines of perforation may either be linear or nonlinear, e.g, like the shaped perforation patterns 133 in FIG. 7.

As shown in FIG. 7, the repeating lines of perforation 132 may comprise a plurality of individual perforations 134 extending substantially from the first side 122a to the second side 122b of the web 122. Each one of the plurality of individual perforations 134 is selectively located in relation to the adjacent ones of the individual perforations 134. In this manner, a selected perforation design such as the shaped perforation patterns 133 is provided for each of the repeating lines of perforation 132 which are formed along the web 122 by the apparatus 100.

Still referring to FIG. 7, the sheets such as 128 which are produced on a web by the apparatus 100 may be formed in such manner that each of the repeating lines of perforation such as 132 is selectively located relative to adjacent ones of the repeating lines of perforation to define a selected perforation pattern format or sheet length. This can be done, for example, by varying the diameter of the pattern roll 104, or by locating two or more sets of protrusions 114 about the circumference of the pattern roll 104. In other words, the spacing or distance between the lines of perforation such as 132 which extend generally in the cross direction of a web such as 122 to thereby define a sheet such as 128 on the web may be selected and varied as described to form a web product having a desired perforation pattern format or sheet length.

From the foregoing, it will be understood that the apparatus 100 may produce repeating lines of perforation comprising a plurality of individual web penetration points. The plurality of individual web penetration points produced with the apparatus 100 form the corresponding individual perforations 134 which may extend from the first side 122a to the second side 122b of a web 122 wherein each one of the plurality of individual web overstrain points is selectively located in relation to adjacent ones of the individual web penetration points. In this manner, the lines of perforation 132 are able to form a selected perforation pattern 133 produced by suitably locating the protrusions 114.

As previously discussed, the sheets 128 produced by the apparatus 100 may have an embossed or printed aesthetic pattern 130 that can be produced in any conventional manner. The selected perforation pattern 133 which comprises perforations 134 formed by the plurality of individual web penetration points may at least complement and can even match or be coordinated with the embossed or printed aesthetic pattern 130. In addition, the contours of the perforation pattern 133 may be made to take virtually any shape due to the ability to locate each of the protrusions 114 on the pattern roll 104 in any position.

In one non-limiting embodiment, the web 122 is presented to the consumer as a convolutely wound or rolled paper product. Such a product is suitable for use as paper towels, bath tissue and the like and may have a length in the machine direction of at least 500 inches and most preferably up to at least about 1000 inches. A chop-off cut may be used to terminate one convolutely wound consumer usable product and start the next product during manufacture.

To achieve the foregoing, the apparatus 100 may further include a chop-off roll 36 and a bedroll 38 downstream of the ring roll 102 and pattern roll 104 to form a chop-off in the manner illustrated and described in U.S. Pat. No. 7,222,436. The perforation pattern formed by the ring roll 102 and pattern roll 104 may be linear or non-linear and may or may not extend perpendicular to the machine direction of the web 122. Similarly, the chop-off may take various forms although in one non-limiting embodiment the chop-off may be shaped rather than straight, e.g., and by way of example only, the chop-off may be chevron shaped substantially in the form shown in FIG. 7. As discussed above, FIG. 7 illustrates lines of perforations 132 that may advantageously take the form of a shaped perforation pattern 133. However, the chop-off roll may be formed so only the chop-off is shaped in the event the lines of perforation 132 extend perpendicular to the machine direction of the web. In any event, a shaped chop-off may assist consumers in starting removal of sheets from an exposed end of a convolutely wound or rolled perforated product.

In other words, the chop-off cut at the exposed end of the wound or rolled product such as paper towels, bath tissue and the like may have the same or a similar shape or design as the lines of perforation 132, or it may have an entirely different shape, e.g., a chevron, by appropriately forming the chop-off roll to provide the desired shape at the end of the last sheet formed on the convolutely wound or rolled perforated product. i.e., the first sheet removed by the consumer.

In an alternative embodiment, the ring roll 102 may be formed to have two sets of protrusions 114 wherein one set produces a perforation pattern that is collectively linear in the cross direction of the web 122 and the other set produces a perforation pattern that is shaped (has both machine and cross directions). It is also possible for both of the two sets of circumferential protrusions to be shaped but to have different shapes and/or for each of the two sets to be formed on a different ring roll in operative association with the same pattern roll 104. It will be appreciated that still other sequences of perforation patterns can be formed by providing two or more sets of circumferential protrusions on two or more ring rolls to provide repeating cycles of different perforation patterns in a convolutely wound or rolled paper product.

While not specifically shown, it will be understood that in the embodiments discussed above, a selected perforation pattern or design can be formed which includes perforations extending not only in the cross direction, but also extending in the machine direction.

As will be appreciated, this can be achieved by appropriately locating the protrusions 114 on the pattern roll 104 in cooperative alignment with a corresponding circumferential groove(s) 106 in the ring roll 102. In a non-limiting form, the protrusions 114 on the pattern roll 104 may be formed to extend both generally in the direction of the rotational axis of the pattern roll 104, and generally about the circumference of the pattern roll 104 in such manner as to be in alignment with the circumferential groove(s) 106, respectively.

Figure 8:
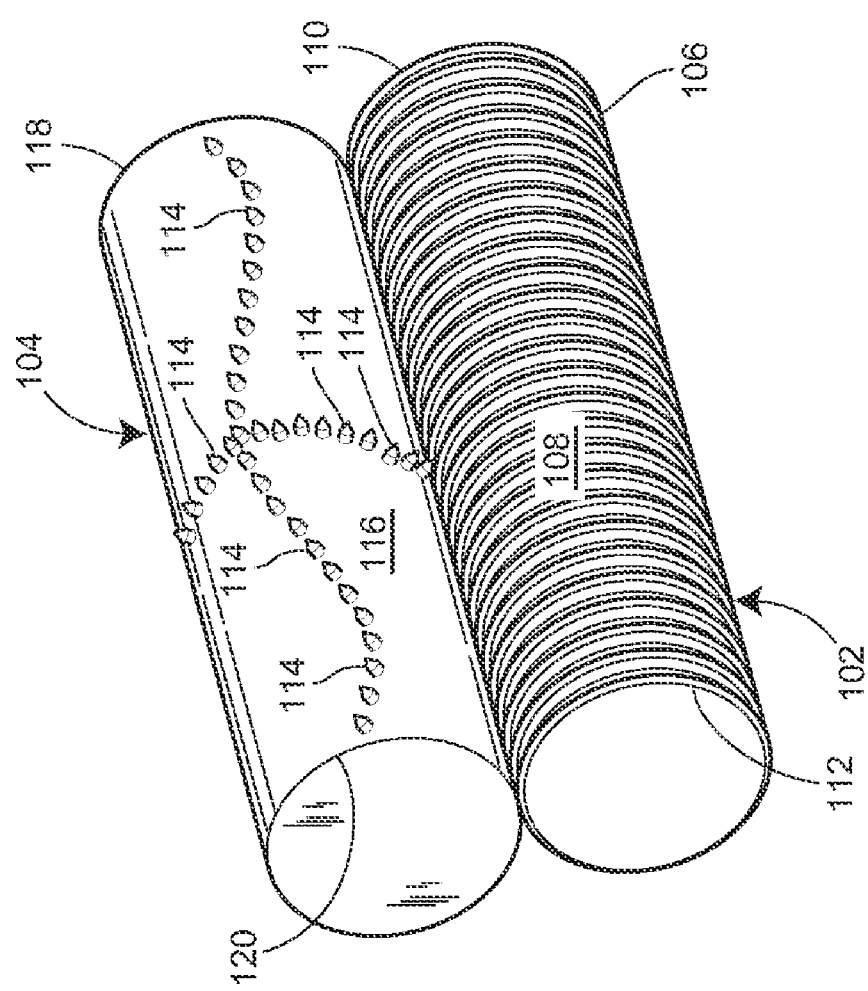
FIG. 8 is a perspective view of an apparatus for perforating a web utilizing a rotatable ring roll and a rotatable pattern roll similar to FIG. 1 but having circumferential protrusions located to form nonlinear perforations in both the cross direction and the machine direction.

With regard to the foregoing, and referring to FIG. 8, the pattern roll 104 may be formed to have protrusions 114 extending in either or both the cross direction and the machine direction to thereby mechanically perforate the web 122 in the cross direction and the machine direction. The pattern roll 104 may also be used to perforate the web 122 in such manner that some or all of the resulting perforation design is linear or non-linear. Referring again to FIG. 8, the pattern roll 104, as illustrated, has protrusions 114 located to mechanically perforate the web 122 in both the cross direction and the machine direction such that the resulting perforation design is non-linear in both the cross and machine directions.

Referring to FIG. 7A, a single sheet 128' is illustrated when produced with a pattern roll 104 having the protrusions 114 non-linearly in both the cross direction and the machine direction. The single sheet 128' as illustrated has a perforation pattern 133' formed by non-linear lines of perforation 132a' extending generally in the cross direction and a non-linear line of perforations 132b' extending generally in the machine direction. As will be appreciated, the contours of the lines of perforation 132a' and 132b' can take virtually any form and/or location by appropriate arrangement of the protrusions 114 on the pattern roll 104.

In addition to the foregoing, the various embodiments illustrated and described result in improved reliability and lower manufacturing costs while at the same time making it possible to form virtually any desired perforation pattern or design.

In all of the foregoing embodiments and configurations, it will be understood that since the webs may be transported along a path relative to the disclosed apparatus components by a device which may comprise a conventional web rewinder of a type well known in the art, the details of the rewinder and the manner in which it transports the web have not been set forth. Furthermore, the details of the web rewinder are not needed to understand the unique features of the embodiments and configurations disclosed herein and the manner in which they function. Similarly, it will be understood that the details need not be set forth for the controllers, motors, and associated gearing suitable for controlling and driving the various perforating, embossing, and/or printing rolls nor for the controllers for controlling the printing of non-contact printing devices such as inkjet printers and laser printers because they are all well known in the art.

With regard to non-limiting embodiments utilizing multiple rolls, cylinder or blades, it will be understood that they can utilize linear actuators and/or similar components for purposes of engaging and disengaging the various rolls, cylinders and/or similar components in a manner well known to those skilled in the art.

"Fibrous structure" as used herein means a structure that comprises one or more fibrous elements. In one example, a fibrous structure according to the present invention means an association of fibrous elements that together form a structure capable of performing a function.

The fibrous structures of the present invention may be homogeneous or may be layered. If layered, the fibrous structures may comprise at least 2 and/or at least 3 and/or at least 4 and/or at least 5 and/or at least 6 and/or at least 7 and/or at least 8 and/or at least 9 and/or at least 10 to about 25 and/or to about 20 and/or to about 18 and/or to about 16 layers.

In one example, the fibrous structures of the present invention are disposable. For example, the fibrous structures of the present invention are non-textile fibrous structures. In another example, the fibrous structures of the present invention are flushable such as bath paper.

Non-limiting examples of processes for making fibrous structures include known wet-laid papermaking processes, air-laid papermaking processes and wet, solution and dry filament spinning processes that are typically referred to as nonwoven processes. Further processing of the fibrous structure may be carried out such that a finished fibrous structure is formed. For example, in typical papermaking processes, the finished fibrous structure is the fibrous structure that is wound on the reel at the end of papermaking. The finished fibrous structure may subsequently be converted into a finished product, e.g. a sanitary tissue product.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to thermoplastic polymer filaments, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers.

Staple fibers may be produced by spinning a filament tow and then cutting the tow into segments of less than 5.08 cm (2 in.) thus producing fibers.

In one example of the present invention, a fiber may be a naturally occurring fiber, which means it is obtained from a naturally occurring source, such as a vegetative source, for example a tree and/or plant. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In addition to the various wood pulp fibers, other cellulosic fibers such as cotton linters, rayon, lyocell and bagasse fibers can be used in the fibrous structures of the present invention. The fibrous structure or material of the web products which are the subject of this invention may be a single-ply or a multi-ply fibrous structure suitable for being converted into a through air dried perforated product.

With regard to the web products which are the subject of this invention, they may be referred to as "sanitary tissue products" which, as used herein, means a soft, low density (i.e. <about 0.15 g/cm$^3$) web useful as a wiping implement for post-urinary and post-bowel movement cleaning (bath tissue), for otorhinolaryngological discharges (facial tissue), and multi-functional absorbent and cleaning uses (absorbent towels). The sanitary tissue products may be convolutely wound or rolled upon itself about a core or without a core to form a sanitary tissue product roll. Such product rolls may comprise a plurality of connected, but perforated sheets of fibrous structure, that are separably dispensable from adjacent sheets.

In one example, the sanitary tissue products of the present invention comprise fibrous structures according to the present invention.

"Basis Weight" as used herein is the weight per unit area of a sample reported in lbs/3000 ft² or g/m². The sanitary tissue products of the present invention may have a Basis Weight of greater than 15 g/m² (9.2 lbs/3000 ft²) to about 120 g/m² (73.8 lbs/3000 ft²) and/or from about 15 g/m² (9.2 lbs/3000 ft²) to about 110 g/m² (67.7 lbs/3000 ft²) and/or from about 20 g/m² (12.3 lbs/3000 ft²) to about 100 g/m² (61.5 lbs/3000 ft²) and/or from about 30 (18.5 lbs/3000 ft²) to 90 g/m² (55.4 lbs/3000 ft²). In addition, the sanitary tissue products of the present invention may exhibit a basis weight between about 40 g/m² (24.6 lbs/3000 ft²) to about 120 g/m² (73.8 lbs/3000 ft²) and/or from about 50 g/m² (30.8 lbs/3000 ft²) to about 110 g/m² (67.7 lbs/3000 ft²) and/or from about 55 g/m² (33.8 lbs/3000 ft²) to about 105 g/m² (64.6 lbs/3000 ft²) and/or from about 60 (36.9 lbs/3000 ft²) to 100 g/m² (61.5 lbs/3000 ft²).

Sanitary tissue products of the present invention may exhibit a Total Dry Tensile value of less than about 3000 g/76.2 mm and/or less than 2000 g/76.2 mm and/or less than 1875 g/76.2 mm and/or less than 1850 g/76.2 mm and/or less than 1800 g/76.2 mm and/or less than 1700 g/76.2 nun and/or less than 1600 g/76.2 mm and/or less than 1560 g/76.2 mm and/or less than 1500 g/76.2 mm to about 450 g/76.2 mm and/or to about 600 g/76.2 mm and/or to about 800 g/76.2 mm and/or to about 1000 g/76.2 mm. In yet another example, the sanitary tissue products, for example single-ply, embossed sanitary tissue products, exhibit a Total Dry Tensile of less than about 1560 g/76.2 mm and/or less than 1500 g/76.2 mm and/or less than 1400 g/76.2 mm and/or less than 1300 g/76.2 mm and/or to about 450 g/76.2 mm and/or to about 600 g/76.2 mm and/or to about 800 g/76.2 mm and/or to about 1000 g/76.2 mm.

The sanitary tissue products of the present invention may exhibit an initial Total Wet Tensile Strength value of less than 600 g/76.2 mm and/or less than 450 g/76.2 mm and/or less than 300 g/76.2 nun and/or less than about 225 g/76.2 mm.

In accordance with the present invention, the web is formed of paper or a like material having one or more plies wherein the material is strong enough to form the wound or rolled product having repeating lines of perforation but weak enough to separate a selected sheet from the remainder of the wound or rolled product. The Perforation Tensile Strength value for sanitary tissue products such as paper towel products, bath tissue products, and the like can be determined by the Perforation Tensile Strength Method described infra.

A single ply paper towel product of the present invention may have a Perforation Tensile Strength value of less than about 150 g/in (1.97 g/76.2 mm), preferably less than about 120 g/in (1.57 g/76.2 mm), even more preferably less than about 100 g/in (1.31 g/76.2 mm), and yet more preferably less than about 50 g/in (0.66 g/76.2 mm). A two ply paper towel product of the present invention may have a Perforation Tensile Strength value of less than about 170 g/in (2.23 g/76.2 mm), more preferably less than about 160 g/in (2.10 g/76.2 mm), even more preferably less than about 150 g/in (1.97 g/76.2 mm), yet more preferably less than about 100 g/in (1.31 g/76.2 mm), even yet more preferably less than about 60 g/in (0.79 g/76.2 mm), and most preferably less than about 50 g/in (0.66 g/76.2 mm). A two-ply bath tissue product of the present invention may have a Perforation Tensile Strength value of less than about 160 g/in (2.10 g/76.2 mm), preferably less than about 150 g/in (1.97 g/76.2 mm), even more preferably less than about 120 g/in (1.57 g/76.2 mm), yet more preferably less than about 100 g/in (1.31 g/76.2 mm), and most preferably less than about 65 g/in (0.85 g/76.2 mm).

The sanitary tissue products of the present invention may exhibit a Density (measured at 95 g/in²) of less than about 0.60 g/cm³ and/or less than about 0.30 g/cm³ and/or less than about 0.20 g/cm³ and/or less than about 0.10 g/cm³ and/or less than about 0.07 g/cm³ and/or less than about 0.05 g/cm³ and/or from about 0.01 g/cm³ to about 0.20 g/cm³ and/or from about 0.02 g/cm³ to about 0.10 g/cm³.

"Density" as used herein is calculated as the quotient of the Basis Weight expressed in grams per square meter divided by the Caliper expressed in microns. The resulting Density is expressed as grams per cubic centimeters (g/cm³ or g/cc). Sanitary tissue products of the present invention may have Densities greater than 0.05 g/cm³ and/or greater than 0.06 g/cm³ and/or greater than 0.07 g/cm³ and/or less than 0.10 g/cm³ and/or less than 0.09 g/cm³ and/or less than 0.08 g/cm³. In one example, a fibrous structure of the present invention exhibits a density of from about 0.055 g/cm³ to about 0.095 g/cm³.

"Embossed" as used herein with respect to a fibrous structure means a fibrous structure that has been subjected to a process which converts a smooth surfaced fibrous structure to a decorative surface by replicating a design on one or more emboss rolls, which form a nip through which the fibrous structure passes. Embossed does not include creping, microcreping, printing or other processes that may impart a texture and/or decorative pattern to a fibrous structure. In one example, the embossed fibrous structure comprises deep nested embossments that exhibit an average peak of the embossment to valley of the embossment difference of greater than 600 μm and/or greater than 700 μm and/or greater than 800 μm and/or greater than 900 μm as measured using MicroCAD.

Test Methods

Unless otherwise specified, all tests described herein including those described under the Definitions section and the following test methods are conducted on samples that have been conditioned in a conditioned room at a temperature of 73° F.±4° F. (about 23° C.±2.2° C.) and a relative humidity of 50%±10% for 2 hours prior to the test. If the sample is in roll form, remove the first 35 to about 50 inches of the sample by unwinding and tearing off via the closest perforation line, if one is present, and discard before testing the sample. All plastic and paper board packaging materials must be carefully removed from the paper samples prior to testing. Discard any damaged product. All tests are conducted in such conditioned room.

a. Perforation Tensile Strength Test Method
Principle:
A strip of sample of known width is cut so that a product perforation line passes across the strip perpendicularly in the narrow (width) dimension about equal distance from either end. The sample is placed in a tensile tester in the normal manner and then tensile strength is determined. The point of failure (break) will be the perforation line. The strength of the perforation is reported in grams.
Apparatus:
Conditioned Room: Temperature and humidity controlled within the following limits:
Temperature –73° F.±2° F. (23° C.±1° C.)
Relative Humidity –50% (±2%)
Sample Cutter: JDC Precision Sample Cutter, 1 inch (25.4 mm) wide double edge cutter, Model JDC-1-12 (Recommended), or Model 1 JDC-1-10; equipped with a safety shield, P&G drawing No. A-PP-421; Obtain the cutter from Thwing Albert Instrument Company, 10960 Dutton Road, Philadelphia, Pa. 19154

Cutting Die: (Only for use in cutting samples with the Alpha Cutter) 1.0 inch wide×8.0 inches (25.4×203.2 mm) long on a ¾ inch (19 mm) base; Acme Steel Rule, Die Corp., 5 Stevens St., Waterbury, Conn., 06714, or equivalent. The die must be modified with soft foam rubber insert material.

Soft foam rubber insert material: Polyurethan, ¼ in. (6.3 mm) thick, P-17 Crofteon, Inc., 1801 West Fourth St., Marion, Ind. 46952, or equivalent.

Tensile Tester: Refer to Analytical Method GCAS 58007265 "Testing and Calibration of Instruments—the Tensile Tester"

Tensile Tester Grips: Thwing-Albert TAPPI air grips 00733-95

Calibration Weights: Refer to Analytical Method GCAS 58007265 "Testing and Calibration of Instruments—The Tensile Tester"

Paper Cutter.

Rule: Ruler to check gauge length, 6 inch (152.4 mm) metal, with 0.01 inch (0.25 mm) graduations. Cat. #C305R-6, L. S. Starrett Co., Athel, Mass. 01331, or equivalent.

Resealable Plastic Bags: Recommended size 26.8 cm×27.9 cm.

Sample Preparation:

For this method, a usable unit is described as one finished product unit regardless of the number of plies.

Condition the rolls or usable units of product, with wrapper or packaging materials removed, in a room conditioned at 50±2% relative humidity, 73° F.±2° F. (23° C.±1° C.) for a minimum of two hours. For new roll remove at least the outer 8-10 usable units of product and discard. Do not test samples with defects such as perforation skips, wrinkles, tears, incomplete perfs, holes, etc. Replace with other usable unites free of such defects. For roll wipes, condition in sealed package for a minimum of two hours.

Towels:

At all times handle the samples in such a manner that the perforations between the usable units are not damaged or weakened. Prepare the samples for testing using one of the two methods (i.e., a continuous five-usable unit-strip or four two-usable unit strips) described below. For usable units having a length (MD) greater than 8 inches (203.2 mm), either approach may be used in preparing the sample. For usable units having a length (MD) less than or equal to 8 inches (203.2 mm), use only the approach requiring strips of two towels to prepare the samples for testing.

A. Continuous Strip of 5 Towels

For the continuous strip of five towels, fold the second towel approximately in the center so that the perforation between towels one and two lies exactly on top of the perforation between towels two and three. Continue folding the remaining usable units until the four perforations contained in the strip of five towels are exactly coincident in a stack. Using the paper cutter, make cuts parallel to the usable units a minimum of 7 inches (177.8 mm) wide by towel width long with the perforation aligned, parallel to the long dimension of the stack and approximately in its center.

B. Strip of 2 Towels

Where four pairs of usable units have been taken for the samples, stack these usable unit pairs, one on the other, so that their perforations are exactly coincident. Proceed as described above to cut this stack of usable units so that the coincident perforations are in the approximate middle of a 7 inch (177.8 mm) minimum by roll width stack and parallel to the stack long dimension.

Bath Tissue/Roll Wipes:

At all times the sample should be handled in such a manner that perforations between usable units are not damaged or weakened. Remove four strips of two usable units each whether consecutively or from various positions in the sample.

Lay the four strips, one on top of the other, being very careful that the perforations between the usable unit pairs are exactly coincident. Note: For roll wipes place the remaining wipes in a resealable plastic bag and seal bag. Test roll wipes immediately.

Using either a JDC cutter or a cutting die and Alpha cutter, cut a one-inch (25.4 mm) wide sample strip four finished product units thick in the machine direction of the stack of four thicknesses of product obtained by one of the above techniques (FIG. 02). The result will be a strip of sample four finished product units thick, one-inch (25.4 mm) wide by a minimum of seven inches (177.8 mm) long, having a perforation line perpendicular to the 8 inch (203.2 mm) dimension of the strip and in its approximate center.

Reference Table 1 for preparation and Tensile Tester settings.

TABLE 1

Perforation Strength Preparation

| Sample Description | Number of product units per test | Number of replicates per sample | Load divider | Tensile grip type |
|---|---|---|---|---|
| Towel | 1 | 4 | 1 | Flat |
| Bath Tissue/Roll Wipes | 1 | 4 | 1 | Flat |

Operation:

Reject results from any strip where the sample is not completely broken, preparing a replacement strip for testing as described in Sample Preparation (see examples below).

Towel (Work-to-Tear and Perforation Stretch):

Clamp the sample in the grips of a properly calibrated tensile tester. Determine the tensile strength and perforation stretch of each of the four strips of each sample. Each strip should break completely at the perforation. In cases where an Intelect 500 Tensile Tester is employed, a sensitivity of 0 g should be used to achieve this.

Bath Tissue/Roll Wipes (Perforation Strength and/or Work-to-Tear and Perforation Stretch):

Clamp the sample in the grips of a properly calibrated tensile tester. Determine the tensile strength of each of the four strips of each sample and/or determine the tensile strength and perforation stretch of each of the four strips of each sample. Each strip should break at the perforation. In cases where an Intelect 500 Tensile Tester is employed, a sensitivity of 0 g should be used to achieve this.

Calculations:

Since some tensile testers incorporate computer capabilities that support calculations, it may not be necessary to apply all of the following calculations to the test results. For example, the Thwing-Albert Intelect II STD tensile tester can be operated through its averaging mode for reporting the average perforation tensile strength and average perforation stretch.

Perforation Tensile Strength (All Products):

The perforation tensile is determined by dividing the sum of the perforation tensile strengths of the product by the number of strips tested.

$$\text{Perforation Stretch} = \frac{\text{Sum of stretch results for strips tested (\%)}}{\text{Number of strips tested}}$$

"Work"-to-Tear Factor:

Work-to-tear Factor (WTTF) =

$$\frac{\text{Perforation Tensile} \times \text{Perforation stretch}}{100}$$

Perforation Tensile to MD Tensile Ratio (PERFMD) (Tissue only):

$$PERFMD = \frac{\text{Perforation Tensile}}{\text{Average Tensile Strength (MD)}}$$

Perforation Stretch:

The perforation stretch is determined by dividing the sum of the perforation stretch readings of the product by the number of strips tested.

$$\text{Perforation Tensile} = \frac{\text{Sum of tensile results for strips tested (grams)}}{\text{Number of strips tested}}$$

b. Tensile Strength Test Method

Remove five (5) strips of four (4) usable units (also referred to as sheets) of fibrous structures and stack one on top of the other to form a long stack with the perforations between the sheets coincident. Identify sheets 1 and 3 for machine direction tensile measurements and sheets 2 and 4 for cross direction tensile measurements. Next, cut through the perforation line using a paper cutter (JDC-1-10 or JDC-1-12 with safety shield from Thwing-Albert Instrument Co. of Philadelphia, Pa.) to make 4 separate stacks. Make sure stacks 1 and 3 are still identified for machine direction testing and stacks 2 and 4 are identified for cross direction testing.

Cut two 1 inch (2.54 cm) wide strips in the machine direction from stacks 1 and 3. Cut two 1 inch (2.54 cm) wide strips in the cross direction from stacks 2 and 4. There are now four 1 inch (2.54 cm) wide strips for machine direction tensile testing and four 1 inch (2.54 cm) wide strips for cross direction tensile testing. For these finished product samples, all eight 1 inch (2.54 cm) wide strips are five usable units (sheets) thick.

For the actual measurement of the tensile strength, use a Thwing-Albert Intelect II Standard Tensile Tester (Thwing-Albert Instrument Co. of Philadelphia, Pa.). Insert the flat face clamps into the unit and calibrate the tester according to the instructions given in the operation manual of the Thwing-Albert Intelect II. Set the instrument crosshead speed to 4.00 in/min (10.16 cm/min) and the 1st and 2nd gauge lengths to 2.00 inches (5.08 cm). The break sensitivity is set to 20.0 grams and the sample width is set to 1.00 inch (2.54 cm) and the sample thickness is set to 0.3937 inch (1 cm). The energy units are set to TEA and the tangent modulus (Modulus) trap setting is set to 38.1 g.

Take one of the fibrous structure sample strips and place one end of it in one clamp of the tensile tester. Place the other end of the fibrous structure sample strip in the other clamp. Make sure the long dimension of the fibrous structure sample strip is running parallel to the sides of the tensile tester. Also make sure the fibrous structure sample strips are not overhanging to the either side of the two clamps. In addition, the pressure of each of the clamps must be in full contact with the fibrous structure sample strip.

After inserting the fibrous structure sample strip into the two clamps, the instrument tension can be monitored. If it shows a value of 5 grams or more, the fibrous structure sample strip is too taut. Conversely, if a period of 2-3 seconds passes after starting the test before any value is recorded, the fibrous structure sample strip is too slack.

Start the tensile tester as described in the tensile tester instrument manual. The test is complete after the crosshead automatically returns to its initial starting position. When the test is complete, read and record the following with units of measure:

Peak Load Tensile (Tensile Strength) (g/in)

Test each of the samples in the same manner, recording the above measured values from each test.

Calculations:

Total Dry Tensile (TDT)=Peak Load MD Tensile (g/in)+Peak Load CD Tensile (g/in)

Tensile Ratio=Peak Load MD Tensile (g/in)/Peak Load CD Tensile (g/in)

Table 2 below tabulates some measured tensile values of various commercially available fibrous structures.

TABLE 2

Total and Perforation Tensile Strength Values for Various Substrates

| Fibrous Structure | # of Plies | Embossed | TAD[1] | Total Dry Tensile Strength g/76.2 mm | Perforation Tensile Strength g/in |
|---|---|---|---|---|---|
| Charmin ® Basic | 1 | N | Y | 1486 | |
| Charmin ® Basic | 1 | N | Y | 1463 | |
| Charmin ® Ultra Soft | 2 | N | Y | 1457 | 171 |
| Charmin ® Ultra Strong | 2 | Y | Y | 2396 | 190 |
| Cottonelle ® | 1 | N | Y | 1606 | |
| Cottonelle ® | 1 | N | Y | 1389 | |
| Cottonelle ® Ultra | 2 | N | Y | 1823 | 174 |
| Cottonelle ® Ultra | 2 | N | Y | 2052 | |
| Scott ® 1000 | 1 | Y | N | 1568 | 271 |
| Scott ® Extra Soft | 1 | N | Y | 1901 | 176 |
| Scott ® Extra Soft | 1 | Y | Y | 1645 | 223 |
| Bounty ® Basic | 1 | N | Y | 3827 | |
| Bounty ® Basic | 1 | Y | Y | 3821 | |
| Viva ® | 1 | N | Y | 2542 | 153 |
| Quilted Northern ® Ultra Plush | 3 | Y | N | 1609 | 166 |
| Quilted Northern ® Ultra | 2 | Y | N | 1296 | |

TABLE 2-continued

Total and Perforation Tensile Strength Values for Various Substrates

| Fibrous Structure | # of Plies | Embossed | TAD[1] | Total Dry Tensile Strength g/76.2 mm | Perforation Tensile Strength g/in |
|---|---|---|---|---|---|
| Quilted Northern ® | 2 | Y | N | 1264 | |
| Angel Soft ® | 2 | Y | N | 1465 | 166 |

[1]"TAD" as used herein means through air dried.

With regard to the foregoing parametric values, they are non-limiting examples of physical property values for some fibrous structures or materials that can be utilized for sanitary tissue products that can be formed as a wound or rolled web in accordance with the present invention. These non-limiting examples are materials which are strong enough to enable a wound or rolled web product to be formed having repeating lines of perforation defining a plurality of sheets. Further, these non-limiting examples are materials which are also weak enough to enable a consumer to separate a selected one of the sheets, typically the end sheet, from the remainder of the wound or rolled product by tearing along one of the lines of perforation defining the sheet.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications may be made without departing from the spirit and scope of the invention. It is therefore intended to cover in the appended claims all such changes and modifications that are within the scope of this invention.

What is claimed is:

1. A web product, comprising:
a web formed of paper or a like material having one or more plies and having a first side, a second side, a machine direction, a cross direction orthogonal and coplanar thereto, and a Z-direction orthogonal to both the machine and cross directions;
a plurality of repeating lines of weakness forming a plurality of separable individual sheets comprising a wound or rolled product, each of said plurality of repeating lines being spaced from each other in the machine direction, each of said repeating lines of weakness comprising a plurality of individual overstrained fibers extending in the Z-direction and substantially from the first to the second side of the web, each of the plurality of individual overstrained fibers being selectively located relative to an adjacent overstrained fiber of the plurality of individual perforations to collectively define a selected perforation design extending from said first side to said second side and having machine direction and cross direction components; and,
wherein the web is formed of a material strong enough to form the wound or rolled product having the repeating lines of weakness but weak enough to separate a selected separable sheet from the remainder of the wound or rolled product by tearing along one of the repeating lines of weakness defining the separable sheet.

2. The product of claim 1 wherein the repeating lines of weakness are produced along the length of the web by passing the web between a rotatable ring roll and a rotatable pattern roll, the ring roll having at least one circumferential groove extending about an outer surface thereof and the pattern roll having circumferential protrusions extending from an outer surface thereof, the protrusions on the pattern roll in selected cooperative alignment with the at least one circumferential groove in the ring roll to permit the protrusions to penetrate the web to form the selected perforation design.

3. The product of claim 2 wherein each of the circumferential protrusions extending from the outer surface of the pattern roll penetrates the web by mating with the at least one circumferential groove extending about the outer surface of the ring roll.

4. The product of claim 2 wherein the circumferential protrusions along an axis of rotation for the pattern roll are each individually circumferentially positioned about the outer surface of the pattern roll to produce the selected perforation design.

5. The product of claim 1 wherein the individual lines of weakness are formed to extend generally in the cross direction of the web and also including a plurality of individual overstrained fibers extending generally in the machine direction of the web.

6. The product of claim 1 wherein the plurality of individual overstrained fibers extend in the Z-direction sufficiently to be visually perceptible.

7. The product of claim 1 wherein at least one of the repeating lines of weakness is shaped.

8. The product of claim 7 wherein every other one of the repeating lines of weakness is shaped.

9. The product of claim 7 wherein all of the repeating lines of weakness are shaped.

10. The product of claim 1 wherein the exposed end of the wound or rolled product is formed by making a shaped chop-off cut.

11. A web product, comprising:
a web formed of paper or a like material having one or more plies and having a first side, a second side, a machine direction, a cross direction orthogonal and coplanar thereto, and a Z-direction orthogonal to both the machine and cross directions;
a plurality of spaced apart and repeating lines of weakness each comprising a plurality of individual visually perceptible Z-direction overstrained fibers, each of said repeating lines of weakness comprising a plurality of individual overstrained fibers extending in the Z-direction and substantially from the first to the second side of the web, each of the plurality of individual overstrained fibers being selectively located relative to an adjacent overstrained fibers of the plurality of individual overstrained fibers to collectively define a selected perforation design extending from said first side to said second side and having machine direction and cross direction components;

wherein each of the plurality of spaced apart and repeating lines of weakness is selectively located relative to an adjacent line of weakness to define a plurality of separable sheets comprising a wound or rolled product;

wherein the web is formed of a material strong enough to form the wound or rolled product having the repeating lines of weakness but weak enough to separate a selected one of the sheets from the remainder of the wound or rolled product by tearing along one of the repeating lines of weakness defining the separable sheet; and, wherein the individual fiber deflections are selectively located so the repeating lines of weakness each comprise a visually perceptible perforation design having machine direction, cross direction, and Z-direction components.

12. The product of claim 11 wherein the repeating lines of weakness are produced along the length of the web by passing the web between a rotatable ring roll and a rotatable pattern roll, the ring roll having at least one circumferential groove extending about an outer surface thereof and the pattern roll having circumferential protrusions extending from an outer surface thereof, the protrusions on the pattern roll in selected cooperative alignment with the at least one circumferential groove in the ring roll to permit the protrusions to penetrate the web to form the nonlinear visually perceptible perforation design.

13. The product of claim 12 wherein each of the circumferential protrusions extending from the outer surface of the pattern roll penetrates the web by mating with the at least one circumferential groove extending about the outer surface of the ring roll.

14. The product of claim 12 wherein the circumferential protrusions along an axis of rotation for the pattern roll are each individually circumferentially positioned about the outer surface of the pattern roll to produce the nonlinear visually perceptible perforation design.

15. The product of claim 11 wherein the visually perceptible individual overstrained fibers are formed to extend generally in the cross direction of the web and also including a plurality of visually perceptible individual overstrained fibers extending generally in the machine direction of the web.

16. A web product comprising:
a web formed of paper or a like material having one or more plies and having a first side, a second side, a machine direction, a cross direction orthogonal and coplanar thereto, and a Z-direction orthogonal to both the machine and cross directions and a repeating aesthetic pattern embossed or printed thereon;

a plurality of spaced apart and repeating lines of weakness each comprising a plurality of individual overstrained fibers extending in the Z-direction and substantially from the first to the second side of the web, each of the plurality of individual overstrained fibers being selectively located relative to an adjacent overstrained fiber of the plurality of individual overstrained fibers to collectively define a selected perforation design extending from said first side to said second side and having machine direction and cross direction components wherein each of the plurality of spaced apart and repeating lines of weakness being selectively located relative to an adjacent line of weakness to define a plurality of separable sheets comprising a wound or rolled product;

wherein the web is formed of a material strong enough to form the wound or rolled product having the repeating lines of weakness but weak enough to separate a selected one of the sheets from the remainder of the wound or rolled product by tearing along one of the repeating lines of weakness defining the sheet; and, wherein selected perforation design is coordinated with the repeating aesthetic pattern on each of the plurality of separable sheets.

17. The product of claim 16 wherein the repeating lines of weakness are produced along the length of the web by passing the web between a rotatable ring roll and a rotatable pattern roll, the ring roll having at least one circumferential groove extending about an outer surface thereof and the pattern roll having circumferential protrusions extending from an outer surface thereof, the protrusions on the pattern roll in selected cooperative alignment with the at least one circumferential groove in the ring roll to permit the protrusions to penetrate the web to form the selected perforation design.

18. The product of claim 17 wherein each of the circumferential protrusions extending from the outer surface of the pattern roll penetrates the web by mating with the at least one circumferential groove extending about the outer surface of the ring roll.

19. The product of claim 17 wherein the circumferential protrusions along an axis of rotation for the pattern roll are each individually circumferentially positioned about the outer surface of the pattern roll to produce the selected perforation design.

20. The product of claim 16 wherein the individual overstrained fibers are formed to extend generally in the cross direction of the web and also including a plurality of individual overstrained fibers extending generally in the machine direction of the web.

* * * * *